Figure 1:
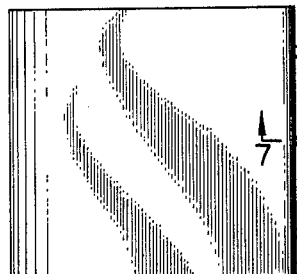

Feb. 2, 1965  J. M. MARCEL  3,168,343
FOLDING MOBILE SHELTER
Filed March 3, 1961  2 Sheets-Sheet 1

INVENTOR.
John Michael Marcel
BY Stanley Wolder

Feb. 2, 1965   J. M. MARCEL   3,168,343
FOLDING MOBILE SHELTER
Filed March 3, 1961   2 Sheets-Sheet 2
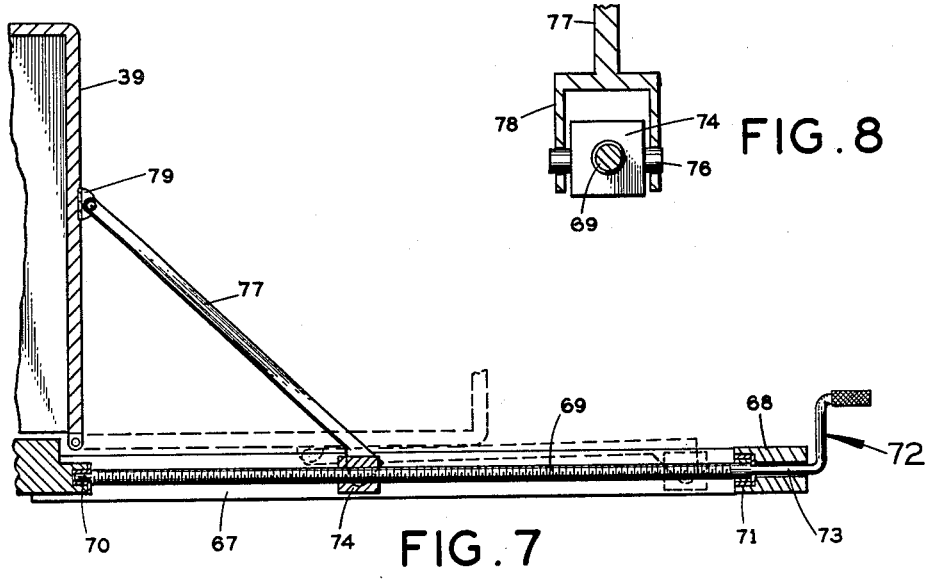
FIG. 8
FIG. 7
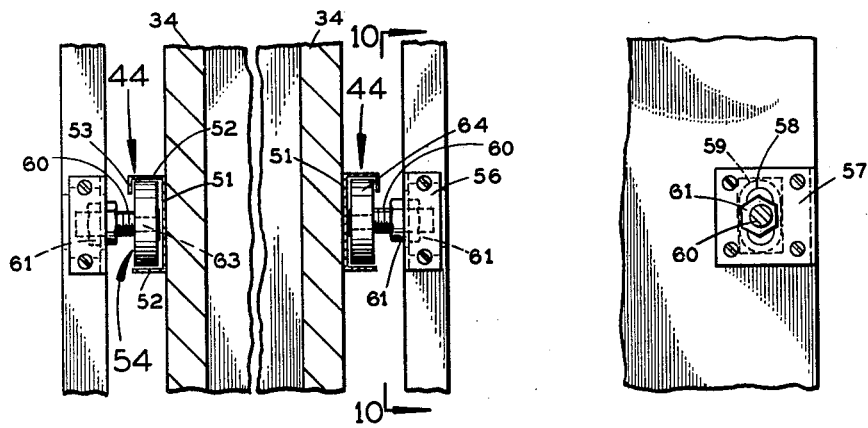
FIG. 9   FIG. 10
INVENTOR.
John Michael Marcel
BY Stanley Wolder United States Patent Office 3,168,343
Patented Feb. 2, 1965

3,168,343
FOLDING MOBILE SHELTER
John Michael Marcel, 21 Holland Park,
London W. 11, England
Filed Mar. 3, 1961, Ser. No. 93,190
4 Claims. (Cl. 296—27)

The present invention relates generally to improvements in land and marine housings, shelters and the like and it relates more particularly to improved collapsible such housings and shelters of the self propelled or towed mobile type.

The conventional mobile shelters and housings notably house trailers, cabins and the like are of permanently rigid construction and retain their full size under all conditions of both use and nonuse. In order to provide adequate head room or sufficient housing space these shelters and housing structures are necessarily high, with the consequent disadvantages of a high center of gravity, and a relatively great air resistance. Moreover the height and size of such rigid mobile shelters gives rise to difficulty in garaging them, makes them very conspicuous and relatively difficult to maneuver in heavy traffic, and frequently causes them to act as obstructions to vision both as regards the driver of the towing vehicle and as regards other traffic. The towing characteristics of such rigid, non-folding mobile shelters are therefore generally unsatisfactory.

Various types of collapsible or folding house trailer have previously been proposed, for example constructed so that certain parts of the shelter body can be telescoped or folded together to reduce the length, width and/or height of the caravan for towing, the caravan being unfolded, expanded or otherwise erected on the camping site to afford an enlarged floor area and/or height for accommodation purposes. Such collapsible or folding shelters thus go far towards eliminating the essential disadvantages of the rigid non-collapsible type of shelter, but have certain drawbacks connected with the complexity of their means of erection, the operation of which will usually require more than one person and occupy a considerable amount of time. While collapsible mobile shelters have been proposed which may be automatically erected by a single person these possessed the drawback of a mechanical cooperation of the various shelter sections during the erection and collapse procedure whereby the kinetic forces were not suitably distributed and applied and would lead to malfunctioning of the erection mechanism and a distortion and jamming of the shelter structure.

It is therefore a principal object of the present invention to provide an improved mobile shelter or housing which may be of the towed or self propelled type.

Another object of the present invention is to provide an improved mobile shelter which may be easily collapsed and erected to facilitate the movement and storage thereof.

Still another object of the present invention is to provide an improved house trailer which may be easily and rapidly collapsed or erected by the simple actuation or manipulation of a hand crank or the like.

A further object of the present invention is to provide a collapsible house trailer of the above nature which is characterized by its ruggedness, simplicity, reliability and freedom from malfunctioning.

Figure 2:
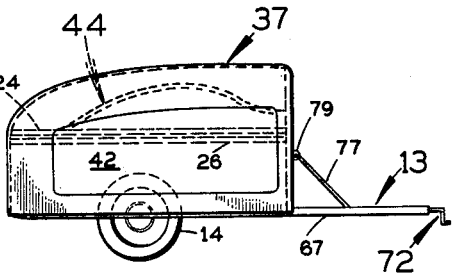
Figure 3:
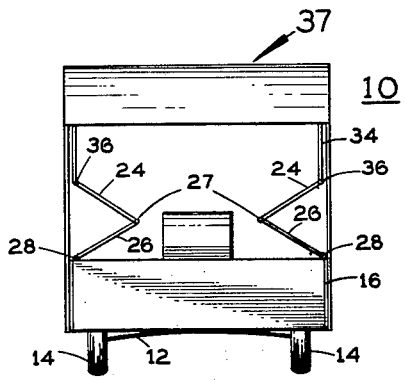
Figure 4:
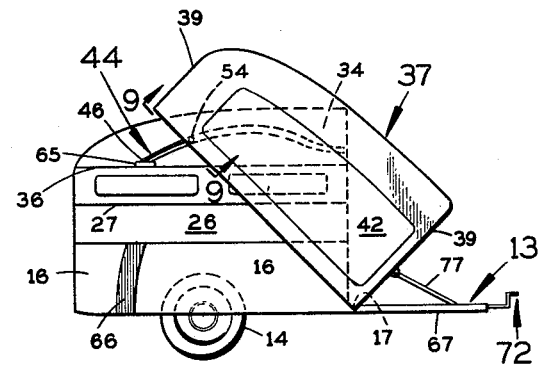
Figure 5:
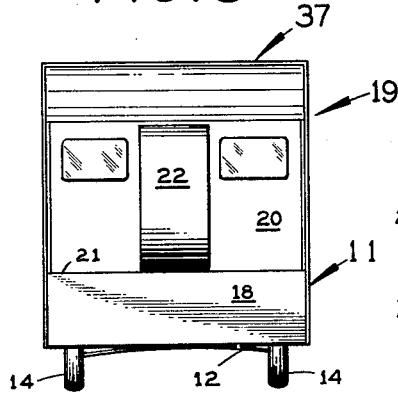
Figure 6:
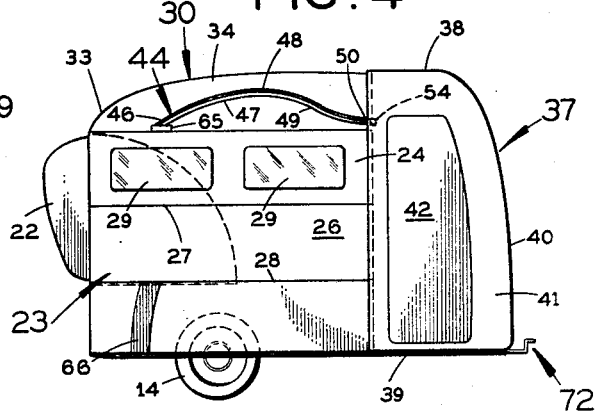

The above and other objects of the present invention will become apparent from a reading of the following description taken in conjunction with the accompanying drawings wherein:

FIGURE 1 is a top plan view of a house trailer embodying the present invention illustrated in collapsed condition;

FIGURE 2 is a side elevational view thereof;
FIGURE 3 is a rear end view of the house trailer in a partially erected position;
FIGURE 4 is a side elevational view thereof;
FIGURE 5 is a rear end view of the house trailer in its fully erected position;
FIGURE 6 is a side elevational view thereof;
FIGURE 7 is an enlarged detailed sectional view taken along line 7—7 in FIGURE 1;
FIGURE 8 is an enlarged detailed sectional view taken along line 8—8 in FIGURE 1;
FIGURE 9 is an enlarged detailed sectional view taken along line 9—9 in FIGURE 4; and
FIGURE 10 is a sectional view taken along line 10—10 in FIGURE 9.

In a sense the present invention contemplates the provision of a collapsible shelter comprising a base member, a cover shell hinged along a transverse edge thereof to said base member and swingable between a collapsed longitudinally extending position and an erected upright position, a roof member mounted on said base member and vertically movable between an elevated position and a depressed position, a pair of longitudinally extending skirt walls depending from opposite edges of said roof member, a pair of parallel tracks mounted on the outer faces of said skirt walls, and a pair of follower members mounted on said cover shell remote from the hinged edge thereof and adapted to engage said tracks whereby movement of said cover shell between its collapsed and erected positions effects the movement of said roof between its depressed and elevated positions.

According to a preferred form of the present invention the shelter base member is mounted on or defined by a trailer chassis and the cover shell includes a depending peripheral wall, the bottom edge of the front section of which is hinged to the front edge of the base member. The shelter is provided with a rear end wall which is hinged to the base rear end and a pair of collapsible side walls each of which includes inwardly collapsible upper and lower longitudinally extending panels hinged along their contiguous edges, the lower edge of the bottom panel being hinged to the base member and the upper edge of the upper panel being hinged to the lower edge of the corresponding roof skirt wall. The track members extend along a curved path from a point forward of the rear section of the skirt walls in a forward upwardly inclined direction and thence in a forward downwardly inclined direction and terminating in an approximately horizontal leg. The path is advantageously downwardly concave the leading section being tangent to the horizontal and terminating near the leading edge of the roof member.

A novel arrangement is employed for effecting the collapse and erection of the shelter and includes a triangular tow bar or frame projecting forwardly from the trailer chassis and carrying a longitudinally extending lead screw terminating in a hand crank. A follower nut registers with the lead screw and is pivotly connected by a rigid link to the cover shell front wall above the lower edge thereof. The subject structure possesses numerous advantages over the collapsible shelters heretofore proposed or used. The shelter is easily manipulated to its collapsed or erected position and, as will be hereinafter set forth, the stresses and mechanical advantages attendant thereto are optimumly distributed.

Referring now to the drawings which illustrate a preferred embodiment of the present invention the reference numeral 10 generally designates an improved house trailer which includes a base member 11 of any suitable configuration which is mounted on a single axled trailer chassis 12 of conventional construction and provided at its leading or front end with a rigidly mounted forwardly projecting tow bar or frame 13. The trailer chassis includes a pair of wheels 14 which nest, in the usual manner, in wells formed in the underface of the base 11. The interior of the base member 11 may be constructed and outfitted as desired and the base member includes longitudinally extending outer side walls 16 and front and rear end walls 17 and 18 respectively.

The collapsible shelter is designated by the numeral 19 and includes a rear end wall 20 of rectangular outline hinged along its lower transverse edge 21 to the upper edge of the base rear wall 18 so as to be foldable inwardly into a horizontal position. The rear wall 20 is provided with a pair of windows and a medially located outwardly directed blister 22 having an inwardly downwardly inclined trailing wall and defining a cup-board or any other desirable recess or receptacle.

The shelter side walls 23 are of the inwardly foldable accordion type and each includes a pair of upper and lower longitudinally extending rectangular panels 24 and 26 respectively, which are hinged to each other along their contiguous longitudinal edges so as to permit the folding of the panels to bring their outerfaces into confronting abutment. The bottom longitudinal edges 28 of the lower side panels 26 are hinged to the upper edges of the base side walls 16 and the upper side panels 24 are provided with windows 29. The shelter side walls 23 are bridged by a roof member 30 which includes a top wall having a horizontal forward section and a curved rearwardly downwardly inclined trailing section 33. The roof member 30 includes flat depending vertical side walls or skirts 34 having horizontal bottom edges 36 hinged to the upper edges of the side wall panels 24 to permit the inward folding thereof. The shape of the blister 22 and the roof trailing section 33 are so related that the blister is accommodated and enclosed by the roof member when the latter is in its bottom collapsed position.

The forward section of the erected shelter 19 is defined by a hollow cover shell 37 including top and bottom horizontal walls 38 and 39 respectively, a front upstanding wall 40 and vertical side walls 41, one of which is provided with a suitable door 42 to provide access into the erected shelter 19. The cover shell 37 is hinged along the trailing transverse edge of the bottom wall 39 to the lower edge of the base front wall 17. The dimensions of the various sections of the shelter are so related as to permit the collapse thereof to the condition illustrated in FIGURES 1 and 2 of the drawing and its erection to the position illustrated in FIGURES 5 and 6 of the drawing. To this end the cover shell 37 is slightly wider than the roof member 30 and base member 16 and slightly longer than these to permit the nesting of the latter in the former, the other dimensional relationship being apparent. Releasable fastening means, not shown, are provided to support the end wall 20 in an erect position and if desired, to lock the side walls 23 in their erect position.

The mechanism for erecting and collapsing the shelter 19 includes a pair of parallel curved track members 44 located on the outer faces of the roof side walls 34. Each of the tracks 44 starts at a trailing point 46 a short distance forward of the rear edge of the wall 34 and slightly above the lower edge thereof, extends for most of its length along an upwardly convex path including a forwardly upwardly inclined section 47, a substantially centrally located apex section 48 and a forwardly downwardly inclined section 49 which tangentially joins a short horizontal section 50 along the bottom leading end of the wall 34. The track section 49 may advantageously be slightly upwardly concave. The track member 44 is formed of a metal channel member including a flat base web 51 suitably secured to the wall 34 and upper and lower legs 52, the upper leg terminating in an inwardly directed lip 53 parallel to the web 51.

Mounted forward of the trailing ends of the free edges of the shell side walls 41 are track follower assemblies 54 so located as to register with the trailing open ends of the tracks 44 when the roof 30 is in its depressed position and the shell is raised to carry the follower assemblies to level of the track trailing ends and as to register with the leading end of track when the roof 30 and the shell 37 are in their fully raised positions. Each of the follower assemblies 54 includes an angular bracket comprising a bottom plate 56 screw fastened to the underface of the shell wall 41 and an integrally formed side plate 57 screw fastened to the inner face of the shell wall 41. The plate 57 has a longitudinally extending slot 58 formed therein which registers with a corresponding slot 59 of greater width and length formed in the shell wall 41. A threaded shank 60 extends through the slot 58 and is adjustable axially and along the length of the slot 58 by means of a pair of registering lock nuts 61 which releasably embrace opposite faces of the bracket plate 57. The shank 60 terminates at its inner end in a stub shaft 63 of reduced cross section which carries a follower defining roller or wheel 64. The follower wheel 64 may advantageously be a ball race which freely engages the track 44 and bears against the upper leg 52. To prevent the abrasion of the base side walls 16 and the lower part of roof side walls 34 by the follower 64 flat metal rub plates 65 and 66 are located respectively on the roof side wall at the trailing end of the tracks 44 and on the base side walls along the path of the followers 64.

The tow bar assembly 13 includes a forwardly converging pair of bars 67 detachably rigidly connected at their trailing ends to the trailer chassis and connected at their leading ends by a block 68, which is provided with conventional means (not shown) for coupling the same to a tractor. A longitudinally extending medially located screw member 69 is journaled at its ends in bearings 70 and 71 nested in corresponding wells formed in the chassis and block 68 respectively. A hand crank 72 is provided with a shank 73 which registers with a bore formed in the block 68 and engages the front end of the screw member 69 to permit the rotation thereof.

A screw follower defining nut or block 74 having a tapped longitudinal bore, engages the screw member 69 and is provided with opposite laterally projecting pins 76. A rigid link 77 terminates at one end in a yoke member 78 having openings formed therein engaging the follower pins 76. Affixed to the shell end wall 39 between the opposite edges thereof is a bracket 79 which pivotly engages the other end of the link 77.

Considering now the operation of the improved collapsible shelter described above, and particularly the erection thereof from its collapsed position illustrated in FIGURES 1 and 2 to its erected position illustrated in FIGURES 5 and 6, the hand crank 72 is rotated in a sense to rotate the screw 69 whereby to advance the screw follower 74 forwardly. The advancing follower 74 pulls on the cover shell end wall 39 by way of the link 77 to rotate the cover shell 37 along its hinge axis toward its elevated position. As the follower wheels 64 are raised with the cover shell 37 they are brought into registry with the trailing ends of the tracks 44. Upon further rotation of the hand crank and raising of the track followers 64, the followers 64 travel along and act on the tracks 44 to urge the tracks 44 and roof member 30 upwardly until the cover shell 37 has been tilted to its upright position. When the cover shell is in its upright position the lower end wall thereof is horizontal and rests on the tow bar assembly and the connecting link 77 likewise assumes a horizontal position. Furthermore, the track followers 64 register with the leading ends of the tracks 44 having lifted the roof member 30 to its fully raised position. With the raising of the roof member, the side wall panels 24 and 26 are extended thereby to effect the erection of the side walls 23. Thereafter the end wall 20 is swung to an upright position and locked in place to complete the erection of the shelter. The collapse of the shelter is effected in a manner opposite to that described above in connection with its erection.

It is important to note that the force necessary to raise the shell 37 during the initial part of its path prior to the raising of the roof 30 therewith is relatively high by reason of its horizontal disposition thereof and the relative position of the actuating mechanism elements. However, the force required is significantly diminished when the track follower engages the track 44 so that no excessive effort is required to manipulate the hand crank. Furthermore, by reason of the shape of the tracks 44 and the arcuate path of the followers 64 and the mechanical advantage relationship the cranking effort is substanttially uniform during most of the erection procedure. In addition the raising force applied to the roof 30 is so distributed at points intermediate the ends thereof as to minimize the possibility of distortion or jamming. Thus during the initial raising of the roof 30 when the shell raising force is high and the mechanical advantage of the screw link arrangement is relatively low the path of the follower and track section 47 vary little so that the raising rate of the roof is low. As the shell 37 swings upwardly so that the force required for further movement thereof is negligible or negative, and the mechanical advantage of the screw link mechanism concurrently increases there is a wide divergence of the path of the track follower 64 and the registering track section 49 so that a maximum roof raising rate is realized until the track section 50 is reached where the follower and track paths almost coincide so that a firm locking of the roof in its uppermost position is achieved.

While there has been described and illustrated a preferred embodiment of the present invention, it is apparent that numerous alterations, omissions and additions may be made without departing from the spirit thereof.

What is claimed is:

1. A collapsible shelter comprising a base member, a cover shell hinged along a transverse edge thereof to said base member and swingable between a collapsed longitudinally extending position and an erected upright position, a roof member mounted on said base member and vertically movable between an elevated position and a depressed position, a pair of longitudinally extending skirt walls depending from opposite edges of said roof member, a pair of parallel tracks mounted on the outer faces of said skirt walls and extending along paths terminating in lower trailing and leading end sections and having raised intermediate sections, said tracks terminating at their leading ends in substantially horizontally extending sections, and a pair of follower members mounted on said cover shell remote from the hinged edge thereof and adapted to engage said tracks whereby movement of said cover shell between its collapsed and erected positions effects the movement of said roof between its depressed and elevated positions.

2. A collapsible shelter comprising a base member, a cover shell hinged along a transverse edge thereof to said base member and swingable between a collapsed longitudinally extending position and an erected upright position, a roof member mounted on said base member and vertically movable between an elevated position and a depressed position, a pair of longitudinally extending skirt walls depending from opposite edges of said roof member, a pair of parallel tracks mounted on the outer faces of said skirt walls and extending along paths terminating in lower trailing and leading end sections and having raised intermediate sections, and a pair of follower members mounted on said cover shell remote from the hinged edge thereof and adapted to engage said tracks, said cover shell including longitudinally extending side walls, said follower members being located on said shell side walls forward of the trailing end of said cover shell and being disposed below and out of engagement with said tracks when said shell is in its collapsed position, whereby movement of said cover shell between its collapsed and erected positions effects the movement of said roof between its depressed and elevated positions.

3. A collapsible shelter according to claim 2 wherein the distance between said follower members and the trailing end of said cover shell is approximately that between the leading end of said tracks and the top of said roof member.

4. A collapsible shelter comprising a base member, a cover shell hinged along a transverse edge thereof to said base member and swingable between a collapsed longitudinally extending position and an erected upright position, a roof member mounted on said base member and vertically movable between an elevated position and a depressed position, means interconnecting said roof member and said cover shell whereby movement of said cover shell between its collapsed and erected positions is accompanied by the movement of said roof member between depressed and raised positions, a screw member projecting longitudinally forwardly of said base member, means for rotating said screw member, a follower block engaging said screw member and a link connecting said follower block to said cover shell at a point above the hinged transverse edge thereof, a tow bar defining frame fastened to said base member and including a pair of legs extending from said base member and converging toward and secured at their leading ends to a connecting block, said screw member extending between said base member and said connecting block.

References Cited in the file of this patent

UNITED STATES PATENTS 722,166    Taft _____ Mar. 3, 1903

FOREIGN PATENTS 199,517    Austria _____ Sept. 10, 1958